(12) United States Patent
Kawano

(10) Patent No.: US 7,742,141 B2
(45) Date of Patent: Jun. 22, 2010

(54) FLAT-PANEL DISPLAY DEVICES INCLUDING MARKINGS AND MANUFACTURING METHOD THEREFOR

(75) Inventor: Shinichi Kawano, Hyogo (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 551 days.

(21) Appl. No.: 11/655,993

(22) Filed: Jan. 22, 2007

(65) Prior Publication Data

US 2007/0176917 A1    Aug. 2, 2007

(30) Foreign Application Priority Data

Jan. 27, 2006    (JP)   ............................ 2006-019025

(51) Int. Cl.
*G02F 1/1345* (2006.01)
(52) U.S. Cl. ...................... 349/149; 345/206
(58) Field of Classification Search ................ 345/205, 345/206; 349/149
See application file for complete search history.

(56) References Cited

U.S. PATENT DOCUMENTS 7,002,657 B2 *   2/2006   Hirosue et al. .............. 349/149

FOREIGN PATENT DOCUMENTS

JP    2000-089241 A    3/2000
JP    2005-115129    4/2005

* cited by examiner

*Primary Examiner*—David Nelms
*Assistant Examiner*—Nathanael R Briggs
(74) *Attorney, Agent, or Firm*—Finnegan, Henderson, Farabow, Garrett & Dunner, L.L.P.

(57) ABSTRACT

A flat-panel display device comprises: a display panel having a pixel area for matrix imaging; a plurality of driver IC chips mounted in a row on a fringe part of the display panel; extension wirings extended out from wirings within the pixel area and electrically connected to terminals of the driver IC chips; and a marking visible with naked eye, which is disposed between a group of the extension wirings connected to one of the driver IC chips and another group of the extension wirings connected to other one of the driver IC chips, and which indicates boundary between said one group and said another group of the extension wirings.

4 Claims, 1 Drawing Sheet

FLAT-PANEL DISPLAY DEVICES INCLUDING MARKINGS AND MANUFACTURING METHOD THEREFOR

CROSS-REFERENCE TO RELATED APPLICATION

This application is based upon and claims the benefit of priority from the prior Japanese Patent Application No. 2006-19025, filed on Jan. 27, 2006; the entire contents of which are incorporated herein by reference.

FIELD OF THE INVENTION

This invention relates to flat-panel display devices such as liquid crystal display (LCD) devices; and especially to those in each of which, a flexible printed circuit board (FPC) for driving a display panel is connected electrically and mechanically onto a fringe part of the display panel, at along one side of its rectangular shape. This invention also relates to manufacturing method of such flat-panel display devices.

BACKGROUND ART

Liquid crystal display devices and other flat-panel display devices are widely used in various fields as image display devices for personal computers, portable information devices or the like in various kinds; in view of their small depth dimension and small weight as well as small electric power consumption. In particular, the flat-panel devices have come to be widely used as the image-displaying devices for; the television sets, ranging from small portable ones to big wall hanging ones; small laptop computers, and other portable information terminals; and car navigation systems or the like.

In following, a light transmissive one of the active-matrix LCD devices is exemplified for explaining its construction.

An active-matrix LCD device is comprised of a matrix array substrate (hereinafter referred as array substrate) and a counter substrate, which are closely opposed to each other with a predetermined gap, and of a liquid crystal layer held in the gap.

The array substrate has signal lines and scanning lines, which are arranged in a latticework on an insulator substrate such as a glass plate, and are overlapped to sandwich an insulator film. On each rectangular patch defined by the signal and scanning lines, a pixel electrode is disposed and formed of a transparent electro-conductive material such as Indium-doped tin oxide (ITO). At around each crossing of the signal and scanning lines, a pixel-switching element is disposed for controlling a respective pixel electrode. When the pixel-switching element is a thin film transistor (TFT), gate and signal electrodes of the TFT are respectively connected with scanning and signal lines; and a source electrode of the TFT is connected with a pixel electrode. The counter substrate has a counter electrode formed of a transparent electro-conductive material such as indium-doped tin oxide (ITO), on an insulator substrate such as a glass plate. When to realize color display, color filter layers are formed on the counter or array substrate.

On the fringe part of the flat-panel display device, for example, the array substrate protrudes from an edge of the counter substrate as to form a shelf region, at along a fringe along length direction or width direction of the substrates. Onto the shelf region, arranged in a row or rows are connector pads for inputting of driving signal from outside into the signal lines and/or scanning lines. As ways for arranging driver IC chips on the fringe part as to input the signal to the connector pads, adopted are "outer lead bonding" (OLB) and "chip on glass" (COG) arrangements. In the "outer lead bonding" (OLB) arrangement, rectangular flexible circuit boards referred as tape carrier packages (TCPs) are mounted on the shelf region. In the "chip on glass" (COG) arrangement, the driver ICs are directly mounted on the shelf region. On most occasions for such mounting, electrically conductive stuff such as anisotropic conductive film (ACF) or the like is used to attach and mount onto the shelf regions, electric terminal faces at ends of the TCPs or terminal-arranging reverse faces of the driver IC chips. In other words, "face-down mounting" is adopted. Such mounting procedure is performed usually by using a heat-press tool so that the ACF, which has been attached on reverse faces of the driver IC chips for example, is heat-pressed at 170-200° C. for 10-20 seconds.

In following, a typical construction of the fringe part is explained exemplarily for the COG arrangement. A shelf region along a length-direction fringe (X fringe) of the flat-panel display device is mounted with a plurality of the driver IC chips that are the X-side driver IC chips for inputting image signals, i.e. data signals, to the signal lines; and another shelf region along a width-direction fringe (Y fringe) is mounted with one or more of the driver IC chips as the Y-side driver IC chip(s) for inputting gate voltage for driving TFTs, consecutively to the scanning lines.

For inputting the signals to the X-side and Y-side driver IC chips, a long band-shaped flexible printed circuit board, which is to be abbreviated as FPC hereinafter, is used as arranged along the X fringe, for example; and signal inputting to the driver IC chips is made through FPC-IC connecting wirings that have been formed by a patterning on beforehand, on the shelf region.

Assembling process of flat-panel display devices are exemplified by follows. A reverse frame for receiving or upbearing the display panel is assembled with a bezel cover as an obverse frame by fixing with screwing or the like as to clamp marginal part of the display panel and thereby secure the display panel. On course of such assembling, the display panel is positioned to a predetermined location, by rib-shaped projections on the reverse frame. Then, in such an aligned state, the display panel and the bezel cover are secured to be non-shiftable onto the reverse frame. When the flat-panel display device is of a backlight type, a surface illuminant device is arranged on reverse face of the display panel. In general, a light-guide plate of the surface illuminant device is received within the reverse frame.

On course of manufacturing the flat-panel display devices, "dynamic operating inspection" is made when the driver IC chips are mounted on the display panel in order to know whether all pixels make normal operation. If and when imaging defect on the screen is found on such inspection, a faulty portion has to be determined; and various investigations for facilitating such determining have been made. Please see JP-2005-115129A or Japan's patent application publication No. 2005-115129. The dynamic operating inspection may reveal that a row of pixel along a signal line exhibits the imaging defect referred as a line defect, and the line defect may be considered to be due to defect of the driver IC chip. In such occasion, the driver IC chip associated with the line defect is picked off and then new one is mounted as a replacement.

BRIEF SUMMARY OF THE INVENTION

A flat-panel display device according to the invention comprises: a display panel having a pixel area for matrix imaging; a plurality of driver IC chips mounted in a row on a fringe part of the display panel; extension wirings extended out from wirings within the pixel area and electrically connected to terminals of the driver IC chips; and a marking visible with naked eye, which is disposed between a group of the extension wirings connected to one of the driver IC chips and another group of the extension wirings connected to other one of the driver IC chips, and which indicates boundary between said one group and said another group of the extension wirings.

A manufacturing method for the flat-panel display device, according to the invention, comprises: preparing a display panel that has a pixel area arrayed with pixel electrodes for matrix imaging and has extension wirings extended out from signal lines or scanning lines within the pixel area to a fringe part of the display area; mounting a plurality of driver IC chips on the fringe part; and inspecting whether every pixel of the display panel acts normally or not; wherein said preparing the display panel comprises arranging of a marking visible with a naked eye between a group of the extension wirings connected to one of the driver IC chips and another group of the extension wirings connected to other one of the driver IC chips, as to indicate boundary between said one group and said another group of the extension wirings; and when said inspecting reveals a line defect and its virtual extension drawn out to the fringe part comes to a region between two adjacent ones of the driver IC chips, it is determined which one of said two adjacent ones of the driver IC chips is connected with wirings on the line defect, by use of the marking; and then the driver IC chip that is determined to be associated with the line defect is detached and new one is mounted as a replacement.

The invention enhances efficiency on repairing procedure to cope with the line defect when the line defect has been detected.

DETAILED DESCRIPTION OF THE INVENTION

The inventor has investigated methods for expediting the repairing procedure after existence of the line defect is revealed, and has reached a conclusion that following processes should be taken. Directly after the line defect is revealed, the driver IC chip connected with wiring of the line defect is picked off and replaced by a new one. If and only if the imaging defect is also appeared at second practicing of the dynamic operating inspection, a procedure for determining defective portion or cause of the imaging defect is carried out. In this way, total duration required for the repairing is minimized.

In such procedure, when visual observation is used in determining which one of the driver IC chips should be picked off, labor burden for the repairing is further decreased. Nevertheless, the line defect may be found at intermediate between two adjacent ones of the driver IC chips. In other words, an extension drawn out from the line defect comes to the intermediate. And, at not a few instances in such circumstance, it is undetermined which one of the driver IC chips should be detached. The visual observation is difficult especially when interval between the driver IC chips is irregular, and a boundary between the groups of the extension wirings does not come to equidistance line from the two adjacent ones of the driver IC chips.

Thus, in such an occasion, both of the two adjacent ones of the driver IC chips have to be detached or alternatively, microscopic observation or the like has to be carried out to determine which of the two adjacent ones should be detached. In view of this, the inventor has further made efforts and has thereby found that it is helpful to arrange a simple marking at the boundary between the two extension wirings groups.

As explained hereto, it is aimed to expedite the repairing procedure after the imaging defect is found, for the flat-panel display device.

Embodiment

Figure 1:
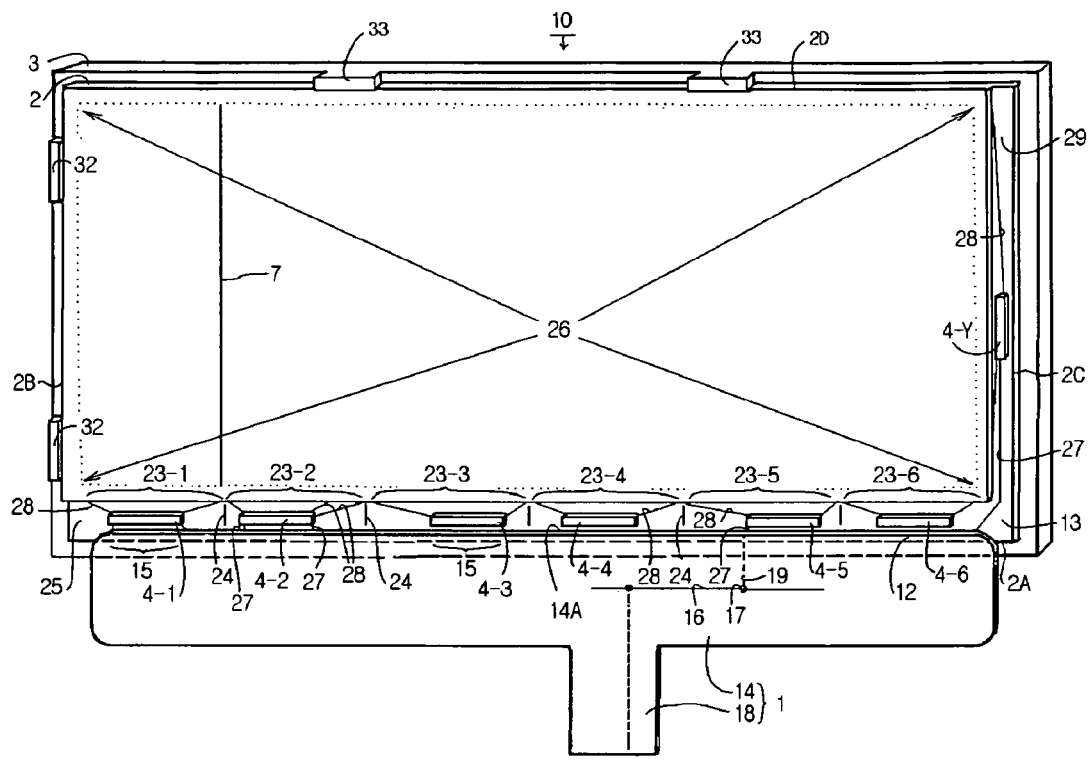
FIG. 1 is a perspective view by and large similar with a plan view, schematically showing a flat-panel display device according to one embodiment of the invention, in a state before attaching a bezel cover and the others.
Figure 2:
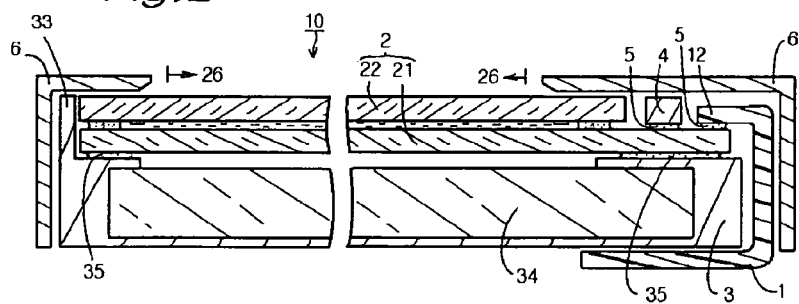
FIG. 2 is a sectional view showing a multi-layer or stacked up construction of the flat-panel display panel shown in FIG. 1.

An embodiment of the invention will be explained by use of FIGS. 1-2. FIG. 1, in a perspective view generally similar with a plan view, schematically shows a flat-panel display device of the embodiment, at a state before folding of the flexible printed circuit board (FPC) 1 onto reverse face and before attaching of a bezel cover. FIG. 2 shows a multi-layer construction or thickness-wise section of the flat-panel display device after assembling.

In a detailed embodiment shown in the drawings, the flat-panel display device 10 is an active-matrix liquid crystal display device in chip-on-glass (COG) arrangement; and has the flexible printed circuit board (FPC) 1 in a band shape that is attached at along an end face on long side of rectangle, or X-side end face 2A, of the display panel 2. A reverse frame 3 upbearing the display panel 2 encases a light-guide plate 34 and a tube-shaped light source not shown, as to form a back light unit. In a detailed example, the flat-panel display device 10 is of a panoramic viewing area (pixel area) that has a length to width ratio of 1/2 and 7-9 inches of diagonal dimension; and is chiefly in vehicle use such as in a vehicle navigation system. The pixel area in the detailed example is arranged with 1024×3 signal lines and 768 scanning lines as to realize an XGA imaging.

As shown in the sectional view of FIG. 2, the display panel 2 is formed by attaching together an array substrate 21 and a counter substrate 22 as to sandwich a liquid crystal layer. The array substrate 21 on reverse side has larger dimensions than the counter substrate 22 on obverse side, and has a part along the X-side end face 2A, which protrudes at along one long side of rectangular shape as to form a shelf-shaped fringe part 25 for inputting of driving signals to the signal lines. Driver IC chips 4 for such signal-line inputting are directly mounted on the shelf-shaped fringe part 25, by way of ACF (anisotropic conductive film) 5 appeared in FIG. 2. Thus, output and input bumps at reverse face of the driver IC chips 4 are electrically connected with output and input lead wirings 27 indicated in FIG. 1, on the array substrate. The driver IC chips 4, each of which usually has an elongated rectangular and flat contour, are arranged in a row along the X-side end face 2A, with one or more predetermined intervals between them.

In an illustrated detailed embodiment, six pieces of the driver IC chips 4-1-4-6 are mounted on the shelf-shaped fringe part 25, along the X-side end face 2A. The intervals between the driver IC chips 4-1-4-6 are irregular and arranged in a manner to form pairs, each of which has within thereof a smaller interval than that between the pairs; such as a pair of the driver IC chips 4-1 and 4-2. Hence, distance between the driver IC chips 4-1 and 4-2 is relatively small while distance between the driver IC chips 4-2 and 4-3 is fairly large. And, distance between the driver IC chips 4-3 and 4-4 is small and same with that between the driver IC chips 4-1 and 4-2. In the illustrated detailed embodiment, another shelf-shaped fringe part 29 is formed along a Y-side end face 2C or one short side of rectangle contour of the substrate, by protrusion of the array substrate 21; and one Y-side driver IC chip 4-Y is mounted on the shelf-shaped fringe part 29.

Further in the illustrated detailed embodiment, the FPC 1 for inputting signals and power to the driver IC chips 4-1-4-6 is comprised of; a band-shaped main part 14 arranged along the X-side end face 2A; and an input terminal section 18 projecting as a branch from outer fringe of the band-shaped main part 14. Inner fringe part of the band-shaped main part 14 is attached on the shelf-shaped fringe part 25 of the display panel 2 by way of the ACF 5 appeared in FIG. 2, over whole length of the inner fringe part, as to make a connection region 12 in an elongated shape for electrical and mechanical connection. In the connection regions 12, portions run along outer fringes of the driver IC chips 4 are output terminal areas 15 and remaining portions are areas that realize only a mechanical connection. Exception for this is as follows. End portion 13 of the connection region 12, near to the Y-side shelf-shaped fringe part 29, makes an electric terminal part that transmits signals and power to the Y-side driver IC chip 4-Y and is electrically connected to bumps at reverse face of the Y-side driver IC chip 4-Y; through an ACF 5 and IC-input lead wirings 27 on the Y-side shelf-shaped fringe part 29.

On a reverse face at each of the output terminal portions 15 of the FPC 1, output terminals are arranged in a row along the inner fringe 14A of the FPC 1. The output terminals are distal end portions of branch wirings 19 on reverse face, which becomes inner face when folded, of the FPC 1. The output terminals are connected through contact holes penetrating a base film of the FPC 1, to main wirings 16 on obverse face, which is outer face when folded, of the FPC 1. The contact holes 17 are branching points for distributing the signal currents and power to branch wirings 19 from main wiring 16. The FPC 1 is comprised of a base film formed of polyimide, on which wirings of metal patterning and insulator films are formed.

Areas overlaid with the output terminal portions 15, on the shelf-shaped fringe part 25, are arranged with IC-inputting lead wirings 27 for inputting signals and power to the driver IC chips 4. Inner end portions, in respect of the display panel 2, of the lead wirings 27 are electrically connected through ACF 5 to input bumps on reverse faces of the driver IC chips 4. Output bumps on the reverse faces of the driver IC chips 4 are electrically connected through the ACF 5 to distal end portions, which are connection pads, of the extension wirings 28 that are drawn out from the signal lines in the pixel area 26 indicated in FIG. 1 by a dotted line box.

As shown in FIG. 1, a bundle of the extension wirings 28 are extended from the pixel area 26 to a seating area for each of the driver IC chips 4, as to form an extension wiring group 23. A region arranged with each of the extension wiring groups 23 is shaped as a trapezoid diverging toward the pixel area. In the illustrated detailed embodiment, each of the regions arranged with the extension wiring groups 23-1-23-6 makes a non-isosceles trapezoid due to unequal intervals of the driver IC chips 4-1-4-6. Moreover, extent of such inequality in oblique-side lengths of the non-isosceles trapezoids consecutively deviates from adjacent one, bit by bit. Consequently, a boundary between the extension wiring groups deviates from equidistant line between adjacent ones of the driver IC chips 4; and a distance from the equidistant line to the actual boundary differs from the other one.

As shown in FIG. 1, a hair-line marking 24, which is formed of a single thin line as to indicate boundary between the extension wiring groups, is arranged on each of non-wiring areas hinged between two adjacent ones of the extension wiring groups 28, on the shelf-shaped fringe part 25. The hair-line marking 24 is arranged to be vertical to the fringe of the pixel area 26 and thus is formed as a straight-line pattern in an orientation same with the signal lines. The hair-line marking 24 runs across an area hinged between the driver IC chips 4 through a triangular non-wiring area hinged between the extension wiring groups 28. Inward end of the hair-line marking 24, in respect of the display panel, is arranged in vicinity of the fringe of the pixel area. When the hair-line marking 24 is formed of a pattern of metal layer, the inward end is spaced apart from the fringe of pixel area to avert short circuiting with patterns in the pixel area or other problems. Distance from the fringe of the pixel area to the inward end of the hair-line marking 24 is in a range of about 0.3 to 4 mm for example, and 3 mm in a detailed example.

The hair-line marking 24 is visible with naked eyes of an ordinary operator, and is therefore formed so that a position indicated by the marking is easily captured by naked eyes. In order to form the mark easily visible and clear in respect of the indicated position, width of the mark is preferably in a range of 0.03 to 0.3 mm, and more preferably in a range of 0.07 to 0.15 mm. The width of the mark would be set as 0.1 mm, for example. Length of the hair-line mark would be preferably in a range of 0.5 to 3 mm, and would be set as 1 mm for example. It is noted that width of each of the extension wirings 28 is small as in a range of 3 to 20 μm for example, thus the extension wirings 28 is considerably difficult to be discerned with naked eyes in most occasions.

The hair-line marking 24 may be formed on the array substrate 21 as a metal pattern that is formed simultaneously with the scanning lines or with the signal lines. When being formed simultaneously with the scanning lines, the marking would be formed of an alloy of molybdenum and tungsten (Mo/W) for example. When being formed simultaneously with the signal lines, the marking would be formed of a multi-layer pattern comprised of aluminum (AL) layer and a layer of the alloy of molybdenum and tungsten (Mo/W). The hair-line marking 24 may be formed by a light shield pattern, if light shield patterns are formed on the array substrate from a resin layer having black pigments or from a metal layer formed of chrome or the like, in a so-called black matrix-on-array arrangement. When the hair-line marking 24 is formed simultaneously with other patterns as in the above, not only additional process for providing the marking is omitted but also a reliable and accurate arrangement of the marking 24 on a designed or intended position is achieved.

As schematically shown in FIG. 1, the dynamic operating inspection reveals a line defect 7 on a certain one of the signal lines, in the pixel area 27, in many occasions. The line defect 7 often comes to position corresponding to areas between the driver IC chips 4. In other words, when a virtual extension is drawn from the line defect 7, the virtual extension would often come to areas between the driver IC chips 4. If so, on basis of the hair-line marking 24, it is easily determined to which one of the extension wiring groups 23-1 and 23-2, an extension wiring 28 that is continuous with a signal line associated with the line defect belongs. Thus, it is immediately determined by a visual observation which one of the driver IC chips 4-1 and 4-2 should be detached.

Exception of the above is as follows. The line defect 7 may come to an extension wiring 28 that is first or second ones as counted from the boundary between the extension wiring groups 23-1 and 23-2; and then, determining by the visual observation is difficult in general. In such occasion, microscopic observation is carried out for the determining, or in otherwise, both of the driver IC chips 4-1 and 4-2 are replaced. However, number of the extension wirings 28 in one of the extension wiring groups 23 is as much as 512 in the detailed embodiment as calculated as follows: 1024×3 (total number of the signal lines)÷6 (number of the driver IC chips on X side)=512. Thus, probability of the above occasion is fairly small, in which the line defect 7 comes to first or second ones of the extension wirings as counted from the boundary.

In place of the hair-line marking 24, markings of other shaping such as wedge-shaped marking or arrow-shaped marking may be adopted.

In following, other constructions appeared in FIGS. 1-2 are explained briefly. As shown in FIG. 1, positioning protrusions 32 and 33 that protrude upward vertically (or frontward vertically to the display panel) from obverse end face of the reverse frame 3. Pair of the positioning protrusions 32 and 33 is arranged on each of adjacent two sides (on left and top sides on FIG. 1), which are fringes that are respectively opposite to the two shelf-shaped fringe parts 25 and 29. The positioning protrusions 33 arranged along an end face 2D opposite to the X-side end face 2A are utilized when arranging the display panel 2 on the reverse frame 3 by abutting with the end face 2D of the display panel 2, as to achieve positioning in a width-wise direction or Y direction of the display panel 2. Meanwhile, the positioning protrusions 32 arranged along an end face 2B opposite to the Y-side end face 2C are utilized when arranging the display panel 2 on the reverse frame 3 by abutting with the end face 2B of the display panel 2, as to achieve positioning in a length-wise direction or X direction of the display panel 2.

As shown in FIG. 2, on beforehand of placing the display panel 2 on the reverse frame 3, a pressure-sensitive adhesive layer 35 is arranged on portions to be sandwiched by the display panel 2 and the reverse frame 3. For example, pressure-sensitive adhesive tapes are attached, or liquid of pressure-sensitive adhesive is applied by a dispenser. Thus, state or relative position obtained by the positioning procedure is kept thereafter unless anomalous external force is applied on the display panel 2 or the reverse frame 3. After such positioning and adhering between them, the FPC 1 is folded at along obverse and reverse ridges of the reverse frame 3 and taken to a folded-back position arranged along reverse face of the reverse frame 3; and then such folded-back position is secured by securing with screws or the like. After such folding back of the FPC 1, a bezel cover 6 is attached from obverse side of the display panel 2 so that the reverse frame 3 with the display panel 2 is fitted into the bezel cover 6.

In the above explanation, the active-matrix LCD device having a TFT in each pixel is exemplified. Nevertheless, same as above goes with the TFD (MIM) LCD devices having thin-film diodes instead of the TFTs; and also with a flat-panel display device comprised of organic electroluminescence elements (organic light emitting diodes).

What is claimed is:

1. A flat-panel display device comprising:
    a display panel having a pixel area for matrix imaging;
    a plurality of driver IC chips mounted in a row on a fringe part of the display panel;
    extension wirings extended out from wirings within the pixel area and electrically connected to terminals of the driver IC chips; and
    a marking visible to the naked eye, the marking:
        being disposed between a first group of the extension wirings connected to a first one of the driver IC chips and a second group of the extension wirings connected to a second one of the driver IC chips, and
        indicating a boundary between said first group and said second group of the extension wirings;
    wherein;
        a region arranged with each of the extension wiring groups is shaped as a trapezoid diverging toward the pixel area; and
        the marking is a straight line having a width dimension in a range of 0.03 mm to 0.3 mm, the line running vertically to the fringe part of the display panel and substantially through a triangular non-wiring area sandwiched between the extension wiring groups.

2. A flat-panel display device according to claim 1, wherein the marking is formed in a process manufacturing substrate forming the display panel, simultaneously with the signal lines, the scanning lines, or other opaque patterns.

3. A flat-panel display device according to claim 1, wherein the marking runs across an area sandwiched between the driver IC chips.

4. A flat-panel display device according to claim 1, wherein
    said region arranged with the extension wiring group makes a non-isosceles trapezoid due to unequal intervals of the driver IC chips; and
    extent of such inequality in oblique-side lengths of the non-isosceles trapezoids consecutively deviates from adjacent one, bit by bit.

* * * * *